United States Patent Office 2,836,061
Patented May 27, 1958

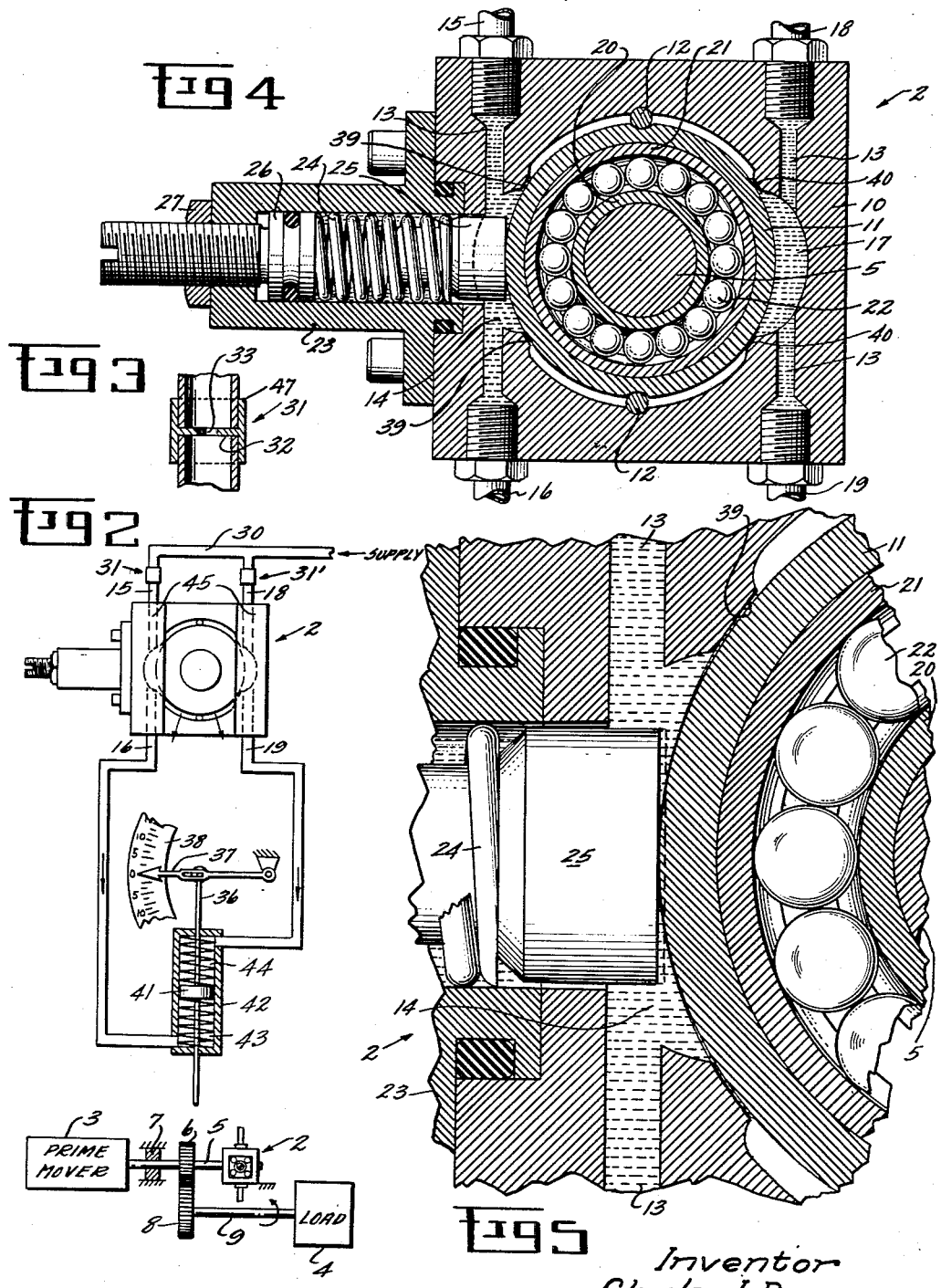

2,836,061
TORQUE SENSING DEVICE

Clyde Jerome Deavers, Schenectady, N. Y., assignor to General Electric Company, a corporation of New York Application March 31, 1955, Serial No. 498,328

7 Claims. (Cl. 73—136)

This invention relates to torque indicators and more particularly to means for measuring the torque transmitted through a shaft and gear mounted thereon.

An object of the invention is to provide a torque measuring device which may readily be installed in a gear box.

Another object of the invention is to provide an improved torque measuring device which is simple and reliable.

Still another object of the invention is to provide a torque measuring device which provides a fluid pressure signal proportional to the torque transmitted by shaft. These and other objects are accomplished by providing an arrangement wherein deflection of a torque transmitting shaft varies the size of a fluid restriction to vary a fluid pressure in proportion to a torque transmitted through the shaft.

The invention will be better understood from the following description taken in connection with the accompanying drawing in which Fig. 1 is a diagrammatic illustration of one embodiment of the invention as applied to a single stage speed reduction gear train;

Fig. 2 is a diagrammatic illustration of the invention as applied to a torque indicating device;

Fig. 3 is an enlarged sectional view of a metering orifice shown in Fig. 2;

Fig. 4 is a sectional view of a bearing structure modified in accordance with the present invention; and Fig. 5 is an enlarged view of a portion of that shown in Fig. 4.

Referring to Fig. 1, a driven element, depicted as a load device 4, is driven by a driving element depicted as a prime mover 3 through a spur gear 6 mounted on an output shaft 5 of the driving element 3 which meshes with a gear 8 mounted on a load shaft 9. The shaft 5 is rotatably supported by bearing means 2 and 7 which are in turn fastened to a support member (not shown). It is well known by those skilled in the art that when a torque is transmitted between two meshing gears such as 6 and 8, there will be a resultant pressure force which is proportional in magnitude to the torque being transmitted. This pressure force acts along a pressure line, the direction of which is principally a function of gear teeth profiles. Generally, however, with the directions of rotation indicated by the arrows in Fig. 1, the pressure force exerted on the shaft 5 will be in a direction normally outward from the plane of the drawing.

Referring to Figs. 2, 4, and 5, the bearing means indicated generally at 2 constitute a torque sensing unit. The sensing unit 2 comprises a casing 10 in which an annular sleeve 11 is mounted, being held in place by two pins 12 which fit in matching grooves in the sleeve and casing. The sleeve fits loosely within the casing so as to provide for limited relative motion therebetween. The casing 10 is so shaped as to provide diametrically opposed recesses 14 and 17 between the casing and sleeve 11. Passages 13 within the casing 10 provide fluid communication between the recess 14 and two fluid conduits 15 and 16 and similar communication between the recess 17 and fluid conduits 18 and 19. End plates 45 (Fig. 2) cover the recesses 14 and 17 to prevent fluid escape therefrom except through the passages 13 and clearances 39 and 40 between the sleeve 11 and casing 10. The casing 10 is oriented with respect to the gears 6 and 8 so that the diametrically opposed recesses 14 and 17 are in alignment with the resultant pressure forces imposed by the meshed gears 6 and 8. A bearing is mounted snugly between the sleeve 11 and shaft 5 which is indicated in the drawing as a conventional ball-bearing comprising an inner race 20, an outer race 21, and balls 22 interposed therebetween. It will be understood by those skilled in the art that any conventional bearing means can be used between the sleeve 11 and shaft 5 with equally good results.

The torque sensor 2 incorporates a biasing device for adjustment purposes. The biasing device comprises a spring housing 23 which is fixed to the casing 10. The spring housing 23 houses a spring 24 which is positioned between a spring retainer 25 and a piston member 26. The piston member 26 has a threaded portion which passes through the outer end of the spring housing 23 which may be rotated to position the piston member. A lock nut 27 is provided to lock the piston member in place when it is properly adjusted. The spring exerts a biasing force on the sleeve member 11 through the spring retainer 25 which has a surface bearing against the sleeve. The bias exerted by the spring 24 on the sleeve 11 can be adjusted and varied by adjusting the position of the piston 26 to vary the spring compression.

Referring to Fig. 2, the fluid conduits 15 and 18 are connected to a common supply conduit 30 from which pressurized fluid is supplied to the sensor 2. In each of the conduits 15 and 18 is a metering orifice 31 which meters the flow of fluid therethrough. Fig. 3 shows an enlarged sectional view of the metering orifice 31. The metering orifice comprises a cylindrical portion 47 having a disk-shaped portion transversely disposed therein, the disk-shaped portion 32 having an opening 33 therein.

Referring again to Fig. 2, the fluid conduits 16 and 19 provide fluid communication between the recesses 14 and 17 respectively and opposite ends of a fluid cylinder 41 which has a piston 42 slidably disposed therein. The piston 42 is biased to a neutral position within the cylinder 41 by springs 43 and 44. A stem 36 is fixed to the piston 42 which is adapted to move a pointer 37 over a calibrated scale 38.

The operation of the device illustrated in Figs. 1–5 inclusive is as follows. Fluid under pressure is supplied to the recesses 14 and 17 from the supply conduit 30 through conduits 15 and 18 respectively. It is evident from Figs. 4 and 5 that the flow of fluid through the conduits 15 and 18 will depend upon the relative position of the sleeve 11 and casing 10. When the sleeve is centered with respect to the casing 10 as shown in Fig. 4, fluid will flow from the recesses through the clearances 39 and 40 between the sleeve and casing and back to the system drain through suitable connections, not shown. The sleeve being centered with respect to the casing, the clearance between the sleeve 11 and casing 10 in the region of the recess 14 will be equal to the clearance at 40 in the region near the recess 17. Therefore, the flow through conduits 15 and 18 will be equal. Should the sleeve 11 become uncentered with respect to the casing 10 however, so that the clearance at 39, for example, exceeds that at 40, the flow through conduit 15 will exceed that through conduit 18. The result of unequal flows through the metering orifices 31 and 31' will be similarly unequal fluid pressures within the recesses 14 and 17. An unbalance in pressure within the recesses 14 and 17 will be transmitted through conduits 16 and 19 to the piston 42 within the cylinder 32. When a pressure unbalance is experienced by the piston 42 it is caused to move against the biasing forces of the springs 43 and 45 consequently causing the pointer 37 to move across the calibrated scale 38. As mentioned above the transmission of a torque through the meshed gears 6 and 8 will create a resultant pressure force which will be transmitted through the shaft 5 and bearing means including the balls 22 to the sleeve 11 in a direction to oppose the biasing force of spring 24 that is exerted against the sleeve 11 by the spring retainer 25. Since the fluid pressures in the recesses 14 and 17 are equal when the sleeve 11 is centered, if it were not for the biasing device including the spring 24, zero pressure difference would occur at no load or zero torque. The biasing device provides a means for adjusting the torque at which a no pressure difference will occur. This feature is advantageous in that it permits adjustment of the torque sensor so that the region of its greatest accuracy which is in the vicinity of a no pressure difference can be adjusted at will. Also, by using the biasing device, the measurement range of the torque sensor is in effect doubled without the necessity of supplying higher supply pressures or larger physical dimensions in the sensor and it permits the hydraulic torque signal to be positive for loads below a given rated value, and negative for torques above that value which is a desirable feature where the fluid torque signal is to be utilized in a servomechanism control system. It should be noted that the linear displacement of the sleeve in the torque sensor is actually very small so that the spring 24 is deflected a very small distance. As the spring deflection is small, the change in biasing force exerted by the spring with deflection is small so that there is little or no sacrifice in linearity of the sensor.

While a particular embodiment of the invention has been illustrated and described, it will be obvious to those familiar with the art that various changes and modifications may be made without departing from the invention and it is intended to cover in the appended claims all such changes and modifications that come within the true spirit and scope of the invention.

What I claim as new and desire to secure by Letters Patent of the United States is:

1. A device for measuring the radial loading on a bearing comprising a casing surrounding said bearing, said casing having a limited area cut out to form in cooperation with said bearing a pair of diametrically opposed recesses, fluid conduit means for supplying pressurized fluid to said recesses through separate restricted passages from a common source, fluid pressure bleed means forming an opening between said casing and said bearing at least at one end of each of said recesses through which fluid is bled from said recesses, means for sensing a pressure differential, and fluid conduit means providing fluid communication between each of said recesses and said differential pressure sensing means.

2. A torque measuring device comprising a shaft rotatably mounted in a bearing, a first gear carried by said shaft and adapted to mesh with a second gear, a casing surrounding said bearing, said casing having a pair of diametrically opposed cavities therein which form a pair of chambers with said bearing, means for supplying pressurized fluid to said pressure chambers through separate restricted passages from a common source, bleed means for said chamber forming an opening the size of which is determined by relative motion between said bearing and said casing, and means for sensing the difference in the fluid pressure in each of said chambers.

3. In a transmission, a shaft rotatably mounted in two bearings, a first gear carried by said shaft between said bearings, and adapted to mesh with a second gear, a casing surrounding one of said bearings and forming therewith two diametrically opposed arcuate chambers, means for supplying pressurized fluid from a common source to each of said chambers through a separate restricted passage, pressure bleed means for each of said chambers forming an opening between said casing and said bearing, at each end of each of said arcuate chambers, fluid pressure differential sensing means, and means for applying the pressure in each of said chambers to said pressure differential sensing means.

4. Apparatus in accordance with claim 3 wherein said chambers are aligned with the resultant pressure force exerted by said first and second gears on said shaft.

5. Apparatus in accordance with claim 1 wherein adjustable biasing means are provided to bias said bearing against said casing along a radial line through said recesses.

6. Apparatus in accordance with claim 2 wherein adjustable biasing means are provided to bias said bearing against said casing along a radial line through said cavities.

7. Apparatus in accordance with claim 3 wherein adjustable biasing means are provided to bias said bearing against said casing along a radial line through said chambers.

References Cited in the file of this patent

UNITED STATES PATENTS

| | | |
|---|---|---|
| 1,967,139 | Wilson | July 17, 1934 |
| 1,976,277 | Blackmon | Oct. 9, 1934 |
| 2,065,702 | Hubbard | Dec. 29, 1936 |
| 2,571,557 | Fortier | Oct. 16, 1951 |

FOREIGN PATENTS

| | | |
|---|---|---|
| 259,210 | Germany | Apr. 26, 1913 |
| 519,829 | Belgium | Nov. 9, 1953 |